(12) United States Patent
Houston et al.

(10) Patent No.: US 8,832,712 B2
(45) Date of Patent: Sep. 9, 2014

(54) SYSTEM AND METHOD FOR SYNCHRONIZING THREADS USING SHARED MEMORY HAVING DIFFERENT BUFFER PORTIONS FOR LOCAL AND REMOTE CORES IN A MULTI-PROCESSOR SYSTEM

(75) Inventors: Michael Houston, Cupertino, CA (US); Stanislaw Skowronek, New York, NY (US); Elaine Poon, Richmond Hill (CA); Brian Emberling, Palo Alto, CA (US)

(73) Assignees: ATI Technologies ULC, Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 561 days.

(21) Appl. No.: 12/846,222

(22) Filed: Jul. 29, 2010
(Under 37 CFR 1.47)

(65) Prior Publication Data
US 2011/0173629 A1    Jul. 14, 2011

Related U.S. Application Data

(60) Provisional application No. 61/240,879, filed on Sep. 9, 2009.

(51) Int. Cl.
*G06F 9/46*      (2006.01)
*G01R 31/28*    (2006.01)
*G06F 9/52*      (2006.01)

(52) U.S. Cl.
CPC .................................. *G06F 9/522* (2013.01)
USPC ........................................... 718/106; 714/39

(58) Field of Classification Search
USPC ............................. 705/7.11; 718/106; 714/39
See application file for complete search history.

(56) References Cited

U.S. PATENT DOCUMENTS

| | | | | |
|---|---|---|---|---|
| 5,649,102 | A * | 7/1997 | Yamauchi et al. | 709/213 |
| 5,692,193 | A * | 11/1997 | Jagannathan et al. | 718/106 |
| 5,815,727 | A * | 9/1998 | Motomura | 712/1 |
| 5,826,081 | A * | 10/1998 | Zolnowsky | 718/103 |
| 5,860,126 | A * | 1/1999 | Mittal | 711/167 |
| 5,862,376 | A * | 1/1999 | Steele et al. | 718/107 |
| 5,887,143 | A * | 3/1999 | Saito et al. | 709/248 |
| 6,044,438 | A * | 3/2000 | Olnowich | 711/130 |
| 6,167,423 | A * | 12/2000 | Chopra et al. | 718/100 |
| 6,466,898 | B1 * | 10/2002 | Chan | 703/17 |
| 6,601,089 | B1 * | 7/2003 | Sistare et al. | 709/213 |
| 6,754,850 | B2 * | 6/2004 | Grey et al. | 714/33 |
| 6,766,515 | B1 * | 7/2004 | Bitar et al. | 718/100 |
| 6,826,752 | B1 * | 11/2004 | Thornley et al. | 718/100 |
| 7,143,416 | B1 * | 11/2006 | Nachef et al. | 719/315 |

(Continued)

OTHER PUBLICATIONS

Cheng, Liqun et al., Fast Barriers for Scalable ccNUMA Systems Proceedings of the 2005 International Conference on Parallel Processing, IEEE, 2005.*

(Continued)

*Primary Examiner* — Scott L Jarrett
(74) *Attorney, Agent, or Firm* — Sterne, Kessler, Goldstein & Fox P.L.L.C.

(57) ABSTRACT

A method of processing threads is provided. The method includes receiving a first thread that accesses a memory resource in a current state, holding the first thread, and releasing the first thread based responsive to a final thread that accesses the memory resource in the current state has been received.

22 Claims, 5 Drawing Sheets

(56) References Cited

U.S. PATENT DOCUMENTS

| | | | | |
|---|---|---|---|---|
| 7,206,964 | B2* | 4/2007 | Moser et al. | 714/13 |
| 7,305,582 | B1* | 12/2007 | Moser et al. | 714/13 |
| 7,366,878 | B1* | 4/2008 | Mills et al. | 712/214 |
| 7,475,397 | B1* | 1/2009 | Garthwaite et al. | 718/101 |
| 7,555,607 | B2* | 6/2009 | Collard et al. | 711/125 |
| 7,587,555 | B2* | 9/2009 | Collard et al. | 711/138 |
| 7,644,409 | B2* | 1/2010 | Dice et al. | 718/104 |
| 7,770,170 | B2* | 8/2010 | Rector et al. | 718/102 |
| 7,788,468 | B1* | 8/2010 | Nickolls et al. | 712/22 |
| 7,908,604 | B2* | 3/2011 | Takayama et al. | 718/101 |
| 7,913,257 | B2* | 3/2011 | Nishikawa | 718/102 |
| 7,937,709 | B2* | 5/2011 | Kottapalli et al. | 718/108 |
| 7,945,911 | B1* | 5/2011 | Garthwaite | 718/102 |
| 7,949,855 | B1* | 5/2011 | Mills et al. | 712/214 |
| 7,984,242 | B2* | 7/2011 | Collard et al. | 711/125 |
| 8,028,132 | B2* | 9/2011 | Widell et al. | 711/150 |
| 8,056,087 | B2* | 11/2011 | Chaudhary et al. | 718/106 |
| 8,060,881 | B2* | 11/2011 | Clift et al. | 718/102 |
| 8,065,681 | B2* | 11/2011 | Jia | 718/102 |
| 8,171,476 | B2* | 5/2012 | Arimilli et al. | 718/102 |
| 8,195,722 | B1* | 6/2012 | Havemose et al. | 707/821 |
| 8,261,046 | B2* | 9/2012 | Gibert et al. | 712/216 |
| 8,468,531 | B2* | 6/2013 | Gschwind et al. | 718/102 |
| 2003/0225816 | A1* | 12/2003 | Morrow et al. | 709/107 |
| 2006/0031844 | A1* | 2/2006 | Dice et al. | 718/106 |
| 2006/0143361 | A1* | 6/2006 | Kottapalli et al. | 711/100 |
| 2007/0016905 | A1* | 1/2007 | Rector et al. | 718/100 |
| 2007/0113232 | A1* | 5/2007 | Collard et al. | 718/101 |
| 2007/0143755 | A1* | 6/2007 | Sahu et al. | 718/100 |
| 2008/0127145 | A1* | 5/2008 | So et al. | 717/149 |
| 2011/0063313 | A1* | 3/2011 | Bolz et al. | 345/531 |

OTHER PUBLICATIONS

Goenka, Vishal, Synchronizing Java Threads on a Shared Resource with Multiple Views Java Developers Journal, Jul. 2001.*
Mellor-Crummey, John M. Algorithms for Scalable Synchronization on Shared Memory Multiprocessors ACM Transactions on Computer Systems, vol. 9, No. 1, Feb. 1991.*
Chen, Jie et al., Multi-Threading Performance on Commodity Multi-Core Processors HPC Asia, 2007.*
Hoover, Greg et al., A Case Study of Multi-Threading in the Embedded Space ACM Cases'06, Oct. 23-25, 2006.*
Ball, Carwyn et al., Barrier Synchronization in Java UKHEC, Technical Report, 2003.*
Sridharan, Srinivas, Implementing Scalable Locks and Barriers on Large-Scale Light-Weight Multithreaded Systems Notre Dame University, Jul. 2006.*
Liu, Shaoshan et al., Synchronization Mechanisms on Modern Multcore Architectures ACSAC, 2007.*
Chen, Ji et al., Software Barrier Performance on Dual Quad-Core Opterons IEEE, International Conference on Networking, Architecture and Storage, 2008.*
Memory Barrier definition Wikipedia.org, Retrieved Jun. 6, 2012.*
Leroy, Xavier et al., Unix system programing in OCaml Aug. 23, 2011, Retrieved from Ocamlunix.forge.ocamlcore.org on Jul. 26, 2012.*
Thread Synchronization, Visual Studio 2005 Microsoft, Retrieved from MSDN.com Jul. 26, 2012.*
Patra, Ashok, Threads and Thread Synchronization in C# The Code Proejct, May 16, 2008.*
Mellor-Crummey, John M. et al., Algorithms for Scalable Synchronization on Shared Memory Multli-processors ACM Transactions on Computer Systems, Feb. 1991.*
Mellor-Crummey, John, Barrier Synchronization Rice University, Mar. 26, 2009.*
Houston, Mike, Anatomy of AMD's TeraScale Graphics Engine Siggraph 2008.*
Zhu, Weirong et al., Synchronization State Buffer: Supporting Efficient Fine-Grain Synchronization on Many-Core Architectures, ACM, ISCA'07, Jun. 9-13, 2007.*
Blochinger, Wolfgang et al., The Distributed Object-Oriented Threads System DOTS Fifth International Symposium on Solving Irregular Structured Problems in Parrell, Vo. 1457, Aug. 1998.*
Bellosa, Frank, Locality-Information-Based Scheduling in Shared Memory Multiprocessors Proceeding IPPS '96 Proceedings of the Workshop on Job Scheduling Strategies for Parallel Processing, 1996.*
Brecht, Timothy B., An Experimental Evaluation of Processor Pool-Based Scheduling for Shared Memory NUMA Multiprocessors, In Job Scheduling Strategies for Parallel Processing, Lecture Notes in Computer Science 1291, 1997.*
Gomex, Joan Carlos et al., The CLAM Approach to Multithreaded Comunication on Shared-Memory Multiprocessors: Design and Experiments, Purdue University, 1996.*

* cited by examiner

SYSTEM AND METHOD FOR SYNCHRONIZING THREADS USING SHARED MEMORY HAVING DIFFERENT BUFFER PORTIONS FOR LOCAL AND REMOTE CORES IN A MULTI-PROCESSOR SYSTEM

CROSS REFERENCE TO RELATED APPLICATIONS

This application claims the benefit of U.S. Provisional Appl. No. 61/240,879, filed Sep. 9, 2009, which is incorporated by reference herein in its entirety.

BACKGROUND

1. Field of the Invention

The present invention generally relates to processing threads in multithreaded environments.

2. Background Art

In some processing systems, multiple threads can be executed concurrently. When the system includes a single processor, the multiple threads can be executed by switching between threads in a time-division multiplexed manner. In multiple processor systems, each processor can concurrently execute one or more threads.

When multiple threads access a common resource, synchronization problems may arise. For example, if multiple threads access a global variable, the first thread cannot proceed to operate on the global variable until the final thread that needs to read the global variable at its current state has accessed the global variable. In existing systems a flag can be used to indicate to the first thread that the final thread has accessed the common resource. For example, the final thread can set this flag after it has accessed the global variable. Once the flag has been set, the first thread can proceed to operate on the global variable. In these systems, however, the first thread, and subsequent threads that precede the final thread, must remain active to check the state of the flag. These active threads occupy valuable processing time that could be used by other threads, leading to both wasted power and decreased performance.

Thus, what is needed are methods and systems that allow for multiple threads to synchronously access a common resource without wasting processing time by repeatedly checking the state of a flag associated with the resource.

BRIEF SUMMARY

In embodiments described herein, a thread synchronization device is provided that allows threads that access a common resource to be held so they do not occupy processing time or consume power while they wait for the final thread to access the common resource. For example, in an embodiment, the thread synchronization device includes a buffer that holds threads until the final thread is received. Once the final thread is received, all of the threads are released either sequentially or simultaneously.

In an embodiment, a method of processing threads is provided. The method includes receiving a first thread that accesses a memory resource in a current state, holding the first thread, and releasing the first thread responsive to a final thread that accesses the memory resource in the current state has been received.

In another embodiment, a thread synchronization device is provided. The thread synchronization device includes an input module configured to receive threads, a buffer configured to hold the threads, and an output module configured to output the threads once a final thread that accesses the common resource is received. All of the threads access a common resource.

In another embodiment, a computer readable medium carrying one or more sequences of one or more instructions for execution by one or more processors to perform a method for processing threads, the instructions when executed by the one or more processors, cause the one or more processors to: receive a first thread that accesses a memory resource in a current state, hold the first thread, and release the first thread based responsive to a final thread that accesses the memory resource in the current state has been received.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Figure 1:
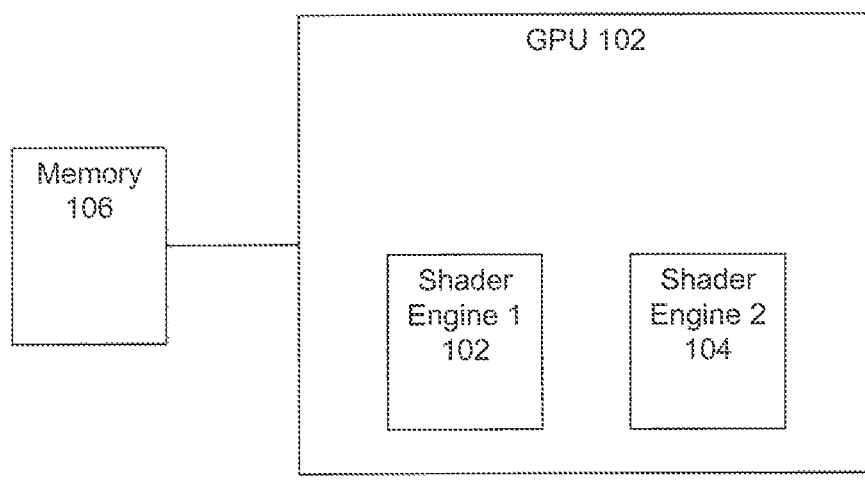
FIG. 1 is a block diagram of an exemplary graphics processing environment.

FIG. 1 is an illustration of an exemplary processing environment 100 that includes a graphics processor unit (GPU) 102 and a memory 106. GPU 102 can complete graphics or compute tasks assigned by a central processing unit (not shown). For example, GPU 102 can complete rendering, display, or other tasks assigned to it by the CPU.

GPU 102 includes first and second shader engines 102 and 104. Shader engines 102 and 104 can, for example, be used to complete rendering or other graphics tasks. Each of shader engines 102 and 104 include one or more processors that allow one or more threads to executed concurrently, e.g., by switching between threads in a time-division multiplexed manner.

In some situations, multiple threads will access a common resource. For example, threads executing on shader engines 102 and 104 can access the same global variable stored in memory 106. In some systems, a flag is used control access to shared resources. For example, threads running on shader engines 102 and 104 can access a shared resource. The first thread accesses the shared resource, e.g., reads the value of the global variable, and then waits until the final thread, i.e., the last thread that needs to access that shared resource in its current state, has accessed the common resource. Once the final thread has completed accessing the resource, it sets the flag associated with the common resource and all of the threads can continue their operation.

Specifically, the first thread and all subsequent threads that access the common resource, continue to check the flag until the final thread has set the flag. Thus, the threads preceding the final thread do not perform useful operations, but rather just check to see if the flag has been set. These threads then occupy the processing time of their shader engine without executing useful operations. The lack of useful operations being conducted results in inefficient power usage (the processor is running, but no useful result has been achieved). This also results in decreased performance (the threads accessing the common resource spend processing time checking to see if the flag has been set, this processing time could have been used by other threads to perform useful operations).

In embodiments described herein, a thread synchronization device is provided that allows threads that access a common resource to be put to "sleep" until the final thread is received. In such a manner, the threads that precede the final thread do not occupy processing time while they wait for the final thread to access the common resource. For example, in an embodiment, the thread synchronization device includes a buffer that holds threads until the final thread is received. Once the final thread is received, all of the threads are released either sequentially or simultaneously.

Figure 2:
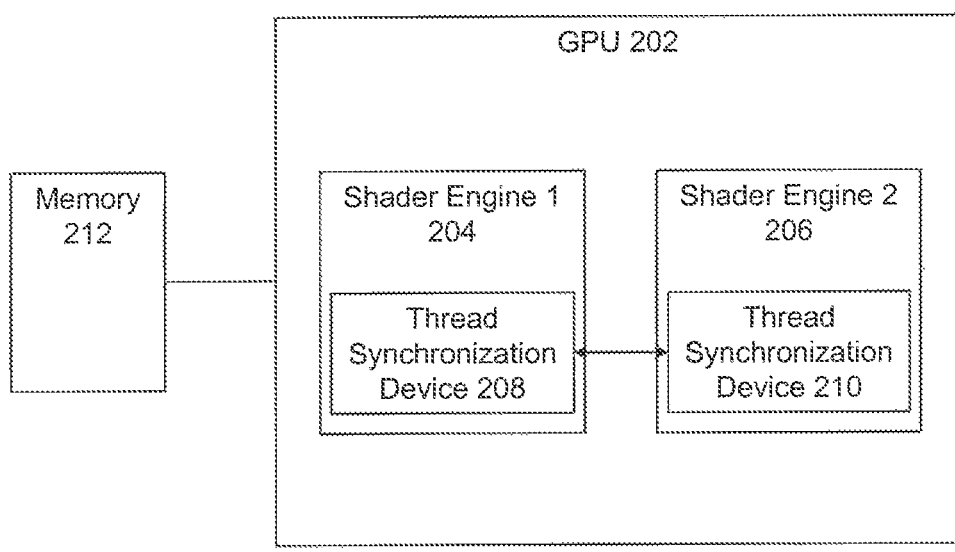
FIG. 2 is an exemplary block diagram of a graphics processing environment, according to an embodiment of the present invention.

FIG. 2 is an illustration of an exemplary computing environment 200, according to an embodiment of the present invention. Computing environment 200 includes a GPU 202 and a memory 212. GPU 202 includes first and second shader engines 204 and 206. First and second shader engines 204 and 206 include first and second thread synchronization devices 208 and 210, respectively. Similar to the manner described above, with respect to shader engines 102 and 104, first and second shader engines 204 and 206 can each include one or more processors that can concurrently process a number of threads, e.g., by switching between threads in a time-division multiplexed manner.

First and second thread synchronization devices 208 and 210 can be used when threads running on first shader engine 208 and/or second shader engine 210 access a common resource. In that case, the first thread to access the shared resource includes an instruction that accesses first thread synchronization device 208 and/or second thread synchronization device 210. For example, the first thread can access first thread synchronization device 208. In an embodiment, first thread synchronization device 208 then allocates a sync resource to the first thread. The sync resource holds the first thread and all threads that will access the common resource in its current state until the final such thread is received and has accessed the common resource. Once the final thread has accessed the common resource, the threads that are being held can be released. In an embodiment, the allocated sync resource can be configured red to operate as a semaphore or a barrier. When the sync resource acts as a semaphore, the threads being held in the sync resource are released sequentially. When the sync resource acts as a barrier, the threads being held in the sync resource are released simultaneously.

As shown in FIG. 2, first thread synchronization device 208 is coupled to second thread synchronization device 210. In this manner, remote threads running on second shader engine 206, that access the common resource, can be routed to and held in first thread synchronization device 208. By including a thread synchronization device in each shader engine, the sync resources that can be used to hold threads increases as the number of shader engines increases, and therefore the total possible number threads running concurrently, increase. By allowing the different thread synchronization devices to communicate, threads running on different shader engines can be held in the same sync resource. Once the final thread has accessed the common resource and has been received by the thread synchronization device, threads from other shader engines are routed back to their respective shader core.

FIG. 2 is an illustration of an exemplary GPU 202 that includes two shader engines. As would be appreciated by those skilled in the relevant art(s) based on the description herein, in other embodiments a GPU can have different numbers of shader engines. For example, a GPU can have three or more shader engines. In another embodiment, GPU 202 can have only a single shader engine.

Figure 3:
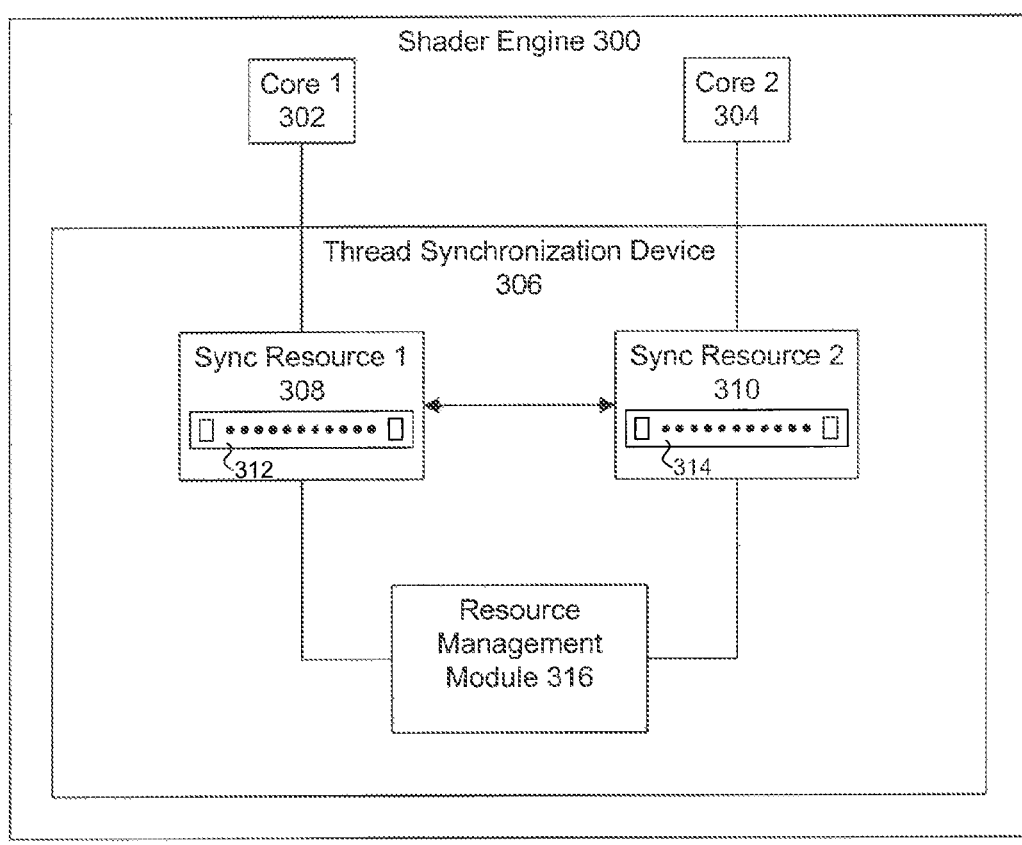
FIG. 3 is an exemplary block diagram of a shader engine, according to an embodiment of the present invention.

FIG. 3 is an illustration of a shader engine 300, according to an embodiment of the present invention. First shader engine 204 and/or second shader engine 206, shown in FIG. 2, are substantially similar to shader engine 300. Shader engine 300 includes first and second processing cores 302 and 304 coupled to a thread synchronization device 306.

Thread synchronization device 306 includes first and second sync resources 308 and 310 coupled to a resource management module 316. Sync resources 308 and 310 include buffers 312 and 314. Each of buffers 312 and 314 are sized to hold as many threads as its respective core can service concurrently. For example, buffer 312 can be sized to hold as many threads as first core 302 can service concurrently. In the example of FIG. 3, first core 302 is configured to run 16 threads concurrently.

Resource management module 316 maintains the states of first and second sync resources 308 and 310. When the first thread to access a common resource running on first core 302 accesses thread synchronization device 306, e.g., through an instruction included in the thread, resource management module 316 allocates sync resource 308 to it. Based on the first thread, resource management module 316 configures first sync resource 308 to operate as a semaphore or a barrier.

When first sync resource 308 operates as a semaphore, threads held in buffer 312 are released sequentially. When sync resource 308 operates as a barrier, threads held in buffer 312 are released simultaneously. Resource management module 316 sets the states of registers associated with first sync resource 308 to configure it to operate as a semaphore or barrier.

As shown in FIG. 3, first and second sync resources 308 and 310 are coupled together. Thus, both remote threads (e.g., threads running on second core 304) and local threads (e.g., threads running on first core 302) can be held in buffer 312 of sync resource 308. As described above, thread synchronization devices included in different shader engines can also be coupled. In this manner, threads running on any core, whether in the same shader engine or not, can be routed to and held in any sync resource.

Figure 4:
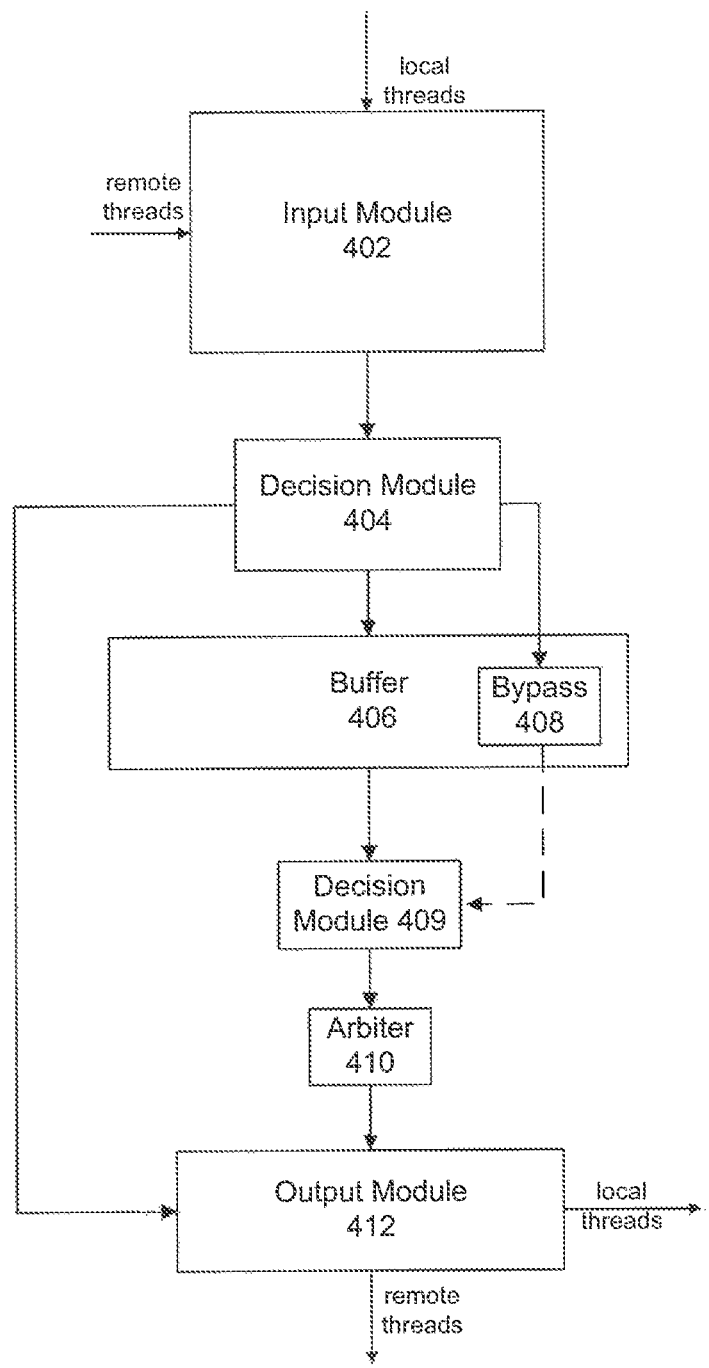
FIG. 4 is an exemplary block diagram of a sync resource, according to an embodiment of the present invention.

FIG. 4 is an illustration of an exemplary block diagram of a sync resource, according to an embodiment of the present invention. First sync resource 308 and/or second sync resource 310 are substantially similar to sync resource 400. Sync resource 402 includes an input module 402, a first decision module 404, a buffer 406, a second decision module 409, an arbiter 410, and an output module 412.

As shown in FIG. 4, input module 402 receives both local and remote threads. Input module 402 forwards the received threads to first decision module 404. First decision module 404 determines whether to forward the received thread to output module 412, buffer 406, or a bypass module 408. First decision module 404 can forward a received thread to output module 412 if it is determined that the thread does not need to be held. For example, it can be determined that no other thread will access the resource that the received thread is accessing.

First decision module 404 can determine to forward the received thread to buffer 406 if the thread is among a group of threads, but not the final thread, that will access a common resource in its current state. In buffer 406, the received thread is put to "sleep." That is, the operation of the received thread is temporarily halted. Thus, the received thread will not occupy processing time to determine whether the common resource has been accessed by the final thread. In the example of FIG. 4, buffer 406 is a partitioned buffer that includes a first portion to hold remote threads and second portion to hold local threads.

First decision module 404 can determine to forward the received thread to bypass module 408, if the received thread is the final thread. The determination of whether a thread is a final thread is based upon a counter. For example, when the first thread is received, a counting value is set indicating the number of threads that will access the common resource at its current value. As the rest of the threads associated with the first thread are received, the counting value is updated (e.g., incremented or decremented depending on the initial value and the particular implementation). In an embodiment, updating the counting value can be an atomic operation, e.g., one that cannot be interrupted. Based on the counting variable, first decision module 404 can determine whether the received thread is the final thread. Thus, the final thread can be termed a "release" thread. Once the final thread is received, the rest of the threads being held in buffer 406 can be released.

If the received thread is the final thread, it is routed to bypass module 408. Bypass module 408 can essentially be a latching device that has some storage to temporarily hold the final thread while the threads being held in buffer 406 are released. In alternate embodiments, decision module 404 does not include a bypass module. Instead, the final thread can be held in buffer 406. Temporarily holding the final thread in bypass module 408 can save space by reducing the size of buffer 406.

As shown in FIG. 4, decision module 409 receives a signal from bypass module 408 indicating that the final thread has been received. Once the final thread is received, threads are released from buffer 406 by second decision module 409. In an embodiment, second decision module 409 releases the threads being held in buffer 406 sequentially if sync resource 400 has been configured to operate as a semaphore. On the other hand, second decision module 409 releases the threads being held in buffer 406 simultaneously if sync resource has been configured to operate as a barrier. For example, if sync resource 400 is configured to operate as a semaphore, decision module 409 may use a counter value to sequentially release threads. Specifically, decision module 409 would continue to update the counter value as threads are released to keep track of the threads.

Threads released by decision module 409 are forwarded to output module 412 by arbiter 410. By way of example, arbiter 410 can be a round-robin arbiter, selecting threads to be routed to output module 412.

Output module 412 outputs threads so they can continue to execute their respective operations. As shown in FIG. 4, output module 412 outputs local threads and remote threads separately so each type of thread can be serviced by its respective core.

As described above, FIG. 4 is an exemplary illustration of a sync resource. In alternate embodiments, however, a sync resource may only include a buffer, e.g., similar to buffer 406. In this alternate embodiment, the functionality of input module 402, decision modules 404 and 409, arbiter 410, and output module 412 can be included in a resource management module, similar to resource management module 316, described with reference to FIG. 3. Thus, the resource management module would then control the hold of threads in a sync resource as well as track the state of each sync resource.

Figure 5:
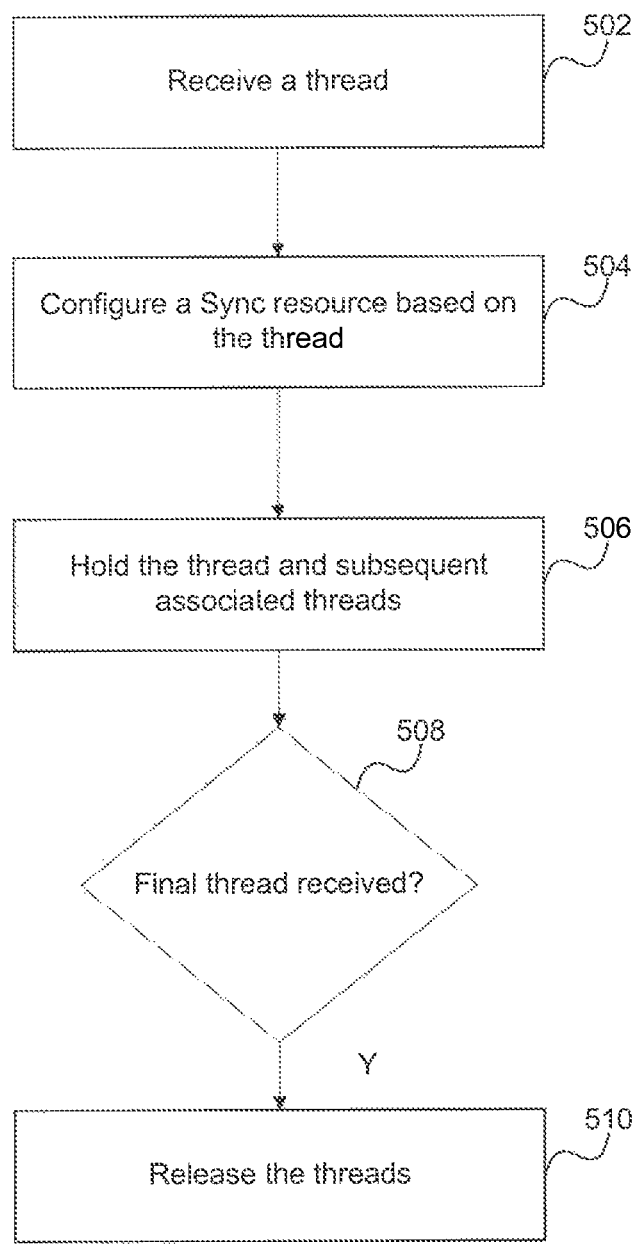
FIG. 5 is a flowchart of an exemplary method of processing threads, according to an embodiment of the present invention.

FIG. 5 is a flowchart of an exemplary method 500 of processing threads, according to the present invention. Other structural and operational embodiments will be apparent to persons skilled in the relevant art(s) based on the following discussion. The steps shown in FIG. 5 do not necessarily have to occur in the order shown. The steps of FIG. 5 are described in detail below.

In step 502, a thread is received. For example, in FIG. 4, a first thread that accesses a common resource is received by input module 402.

In step 504, a sync resource is configured based on the received thread. For example, in FIG. 4, sync resource 400 is configured to operate as a semaphore or barrier based on the first received thread. In an embodiment, second decision module 409 is configured to release threads from buffer 406 either sequentially or simultaneously based on whether sync resource 400 is configured to operate as a semaphore or a barrier.

In step 506, the thread and subsequent threads that access the shared resource in its current state are held. For example, in FIG. 4, the first thread and all subsequent threads that precede the final thread are held in buffer 406.

In step 508, it is determined if the final thread has been received. For example, in FIG. 4, a counting value is used to determine if the final thread has been received. The final thread is routed to bypass module 408.

Once the final thread has been received, flowchart 500 advances to step 510. In step 510, the threads are released. For example, in FIG. 4, threads are released from buffer 406 by decision module 409 either sequentially or simultaneously, as described above. Once the threads are released from buffer 406, they are passed to output module 410 by arbiter 410. Output module 412 then routes the threads to the local core or a remote core so that they can continue to operate.

Embodiments of the present invention may be used in any computing device where register resources are to be managed among a plurality of concurrently executing processes. For example and without limitation, embodiments may include computers, game platforms, entertainment platforms, personal digital assistants, and video platforms. Embodiments of the present invention may be encoded in many programming languages including hardware description languages (HDL), assembly language, and C language. For example, an HDL, e.g., Verilog, can be used to synthesize, simulate, and manufacture a device that implements the aspects of one or more embodiments of the present invention. For example, Verilog can be used to model, design, verify, and/or implement aspects of the components shown in FIGS. 2-4.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   receiving a first thread from a first processing core and a second thread from a second processing core, wherein the first processing core is a local processing core;
   determining whether to forward the received first thread and the received second thread to an output module;
   holding, by one or more processing devices, the received first thread and the received second thread in a partitioned buffer, wherein the partitioned buffer includes a first portion configured to hold the received first thread from the local processing core and a second portion configured to hold threads from one or more remote processing cores, wherein the one or more remote processing cores comprises at least the second processing core;
   releasing the received first thread and the received second thread after receipt of a final thread, wherein the final thread is determined based upon a counter;
   holding the final thread in the partitioned buffer; and
   setting an indicator of a number of threads that will access a common resource at a current value.

2. The method of claim 1, further comprising:
   routing the final thread to a bypass module.

3. The method of claim 1, further comprising:
   holding the final thread in the partitioned buffer.

4. The method of claim 1, wherein the releasing releases the threads sequentially.

5. The method of claim 1, wherein the releasing releases the threads simultaneously.

6. The method of claim 1, further comprising:
   determining whether the final thread has accessed a common memory resource at a current value.

7. The method of claim 1, wherein the indicator is a counting value.

8. The method of claim 7, wherein updating the counting value is an atomic operation.

9. A thread synchronization device, comprising:
   a first synchronization resource of a first processing core, wherein the first synchronization resource comprises:
     an input module configured to receive a first thread from the first processing core and a second thread from a second processing core, wherein the first processing core is a local processing core;
     a first decision module configured to determine whether to forward the received first thread and the received second thread to an output module;
     a partitioned buffer configured to hold the received first thread and the received second thread, wherein the partitioned buffer includes a first portion configured to hold the received first thread from the local processing core and a second portion configured to hold threads from one or more remote processing cores, wherein the one or more remote processing cores comprises at least the second processing core; and
     a second decision module configured to:
       release the received first thread and the received second thread after receipt of a final thread, wherein the final thread is determined based upon a counter,
       hold the final thread in the partitioned buffer, and
       set an indicator of a number of threads that will access a common resource at a current value.

10. The thread synchronization device of claim 9, wherein the second decision module is further configured to release the threads held in the partitioned buffer sequentially.

11. The thread synchronization device of claim 9, wherein the second decision module is further configured to release the threads held in the partitioned buffer simultaneously.

12. The thread synchronization device of claim 9, further comprising:
    a bypass module configured to temporarily hold the final thread.

13. The thread synchronization device of claim 9, wherein the first decision module is further configured to route the final thread to a bypass module.

14. The thread synchronization device of claim 9, further comprising:
    a resource management module configured to maintain states of the first synchronization resource and a second synchronization resource, wherein the resource management module is coupled to the first synchronization resource and the second synchronization resource.

15. The thread synchronization device of claim 9, wherein the indicator is a counting value.

16. The thread synchronization device of claim 15, wherein updating of the counting value is an atomic operation.

17. A computer readable medium carrying one or more sequences of one or more instructions for execution by one or more processors to perform a method for processing threads, the instructions when executed by the one or more processors, cause the one or more processors to:
    receive a first thread from a first processing core and a second thread from a second processing core, wherein the first processing core is a local processing core;
    determine whether to forward the received first thread and the received second thread to an output module;
    hold, by one or more processing devices, the received first thread and the received second thread in a partitioned buffer, wherein the partitioned buffer includes a first portion configured to hold the received first thread from the local processing core and a second portion configured to hold threads from one or more remote processing cores, wherein the one or more remote processing cores comprises at least the second processing core;

release the received first thread and the received second thread after receipt of a final thread, wherein the final thread is determined based upon a counter;

hold the final thread in the partitioned buffer; and set an indicator of a number of threads that will access a common resource at a current value.

18. The computer readable medium of claim 17, further comprising:

routing the final thread to a bypass module.

19. The computer readable medium of claim 17, wherein the threads are released sequentially.

20. The computer readable medium of claim 17, wherein the threads are released simultaneously.

21. The computer readable medium of claim 17, wherein the indicator is a counting value.

22. The computer readable medium of claim 21, wherein updating of the counting value is an atomic operation.

* * * * *